United States Patent
Wang

(10) Patent No.: US 11,062,531 B2
(45) Date of Patent: Jul. 13, 2021

(54) CROSS-GROUP MESSAGING

(71) Applicant: FORD GLOBAL TECHNOLOGIES, LLC, Dearborn, MI (US)

(72) Inventor: Wei Wang, Jiangsu (CN)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 16/257,091

(22) Filed: Jan. 25, 2019

(65) Prior Publication Data

US 2019/0228598 A1 Jul. 25, 2019

(30) Foreign Application Priority Data

Jan. 25, 2018 (CN) .......................... 201810072268.4

(51) Int. Cl.
*G07C 5/00* (2006.01)
*H04W 4/08* (2009.01)
*H04W 4/46* (2018.01)

(52) U.S. Cl.
CPC .............. *G07C 5/008* (2013.01); *H04W 4/08* (2013.01); *H04W 4/46* (2018.02)

(58) Field of Classification Search
CPC ........... G07C 5/008; H04W 4/46; H04W 4/08
See application file for complete search history.

(56) References Cited

U.S. PATENT DOCUMENTS

| | | | |
|---|---|---|---|
| 9,571,374 B2 | 2/2017 | Ashok et al. | |
| 2010/0317376 A1* | 12/2010 | Anisimov | H04L 51/38 455/466 |
| 2011/0121991 A1* | 5/2011 | Basir | G08G 1/096716 340/902 |
| 2012/0297321 A1* | 11/2012 | Douglas | H04L 51/043 715/758 |
| 2014/0074957 A1 | 3/2014 | Liu et al. | |
| 2014/0302774 A1 | 10/2014 | Burke et al. | |
| 2016/0277513 A1* | 9/2016 | Kim | H04L 67/18 |
| 2017/0373994 A1* | 12/2017 | Chen | H04L 51/20 |
| 2018/0018798 A1* | 1/2018 | Li | H04L 51/04 |
| 2019/0037066 A1* | 1/2019 | Han | H04W 4/00 |

* cited by examiner

*Primary Examiner* — Hussein Elchanti
(74) *Attorney, Agent, or Firm* — Michael Spenner; Brooks Kushman P.C.

(57) ABSTRACT

A system for a vehicle comprises a controller, configured to send group preference data to a server to cause the server to link the vehicle to groups including other vehicles consistent with the group preference data; receive a response link from the server acknowledging receipt of the group preference data; and communicate multiple messages between the vehicle and the other vehicles determined by the server to be in the same groups as the vehicle.

20 Claims, 4 Drawing Sheets

CROSS-GROUP MESSAGING

CROSS-REFERENCE TO RELATED APPLICATIONS

This application claims foreign priority benefits under 35 U.S.C. § 119(a)-(d) to CN Application 2018 100 722 68.4 filed Jan. 25, 2018, which is hereby incorporated by reference in its entirety.

TECHNICAL FIELD

The present disclosure is generally related to a system for cross-group messaging. In particular, the present disclosure is related to a vehicle system for receiving and sending messages to and from multiple groups.

BACKGROUND

While travelling in a vehicle, operators or other users may want to communicate with drivers from specific groups to share information with the groups. For instance, a user may want to share information about an accident to other users in the area, or information about his or her specific vehicle to users operating the same vehicle model. Under a traditional network structure, the user may need to manually and frequently change vehicle communication settings to share information with various target groups while operating the vehicle.

SUMMARY

In one or more illustrative embodiments, a system for a vehicle comprises a controller, configured to send group preference data to a server to cause the server to link the vehicle to groups including other vehicles consistent with the group preference data; receive a response link from the server acknowledging receipt of the group preference data; and communicate multiple messages between the vehicle and the other vehicles determined by the server to be in the same groups as the vehicle.

In one or more illustrative embodiments, a server comprises a processor programmed to, responsive to group preferences received from multiple vehicles, send response links to the multiple vehicles acknowledging the reception of the group preferences, establish multiple groups and link the multiple vehicles to the multiple groups, and responsive to receiving a message sent from a vehicle, forward the message to members of a group to which the vehicle is linked.

In one or more illustrative embodiments, a method for a vehicle to communicate messages with other vehicles comprises sending, to a server, group preference data including a brand of the vehicle, a model of the vehicle, and a destination of the vehicle; wirelessly linking to groups as identified by the server, the groups including a group for vehicles of the same brand as the vehicle, a group for vehicles of the same model as the vehicle, and a group for vehicles headed to the same destination as the vehicle; receiving a first message from a member of one of the groups via a server; and sending a second message to the server to be sent to vehicles in the groups as identified by the server.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosure generally provides for a plurality of circuits or other electrical devices. All references to the circuits and other electrical devices and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a network topology for cross-group messaging for a vehicle. More specifically, the present disclosure proposes a system for vehicle users to share information with different groups simultaneously based on multiple group preferences selected by the user.

Figure 1:
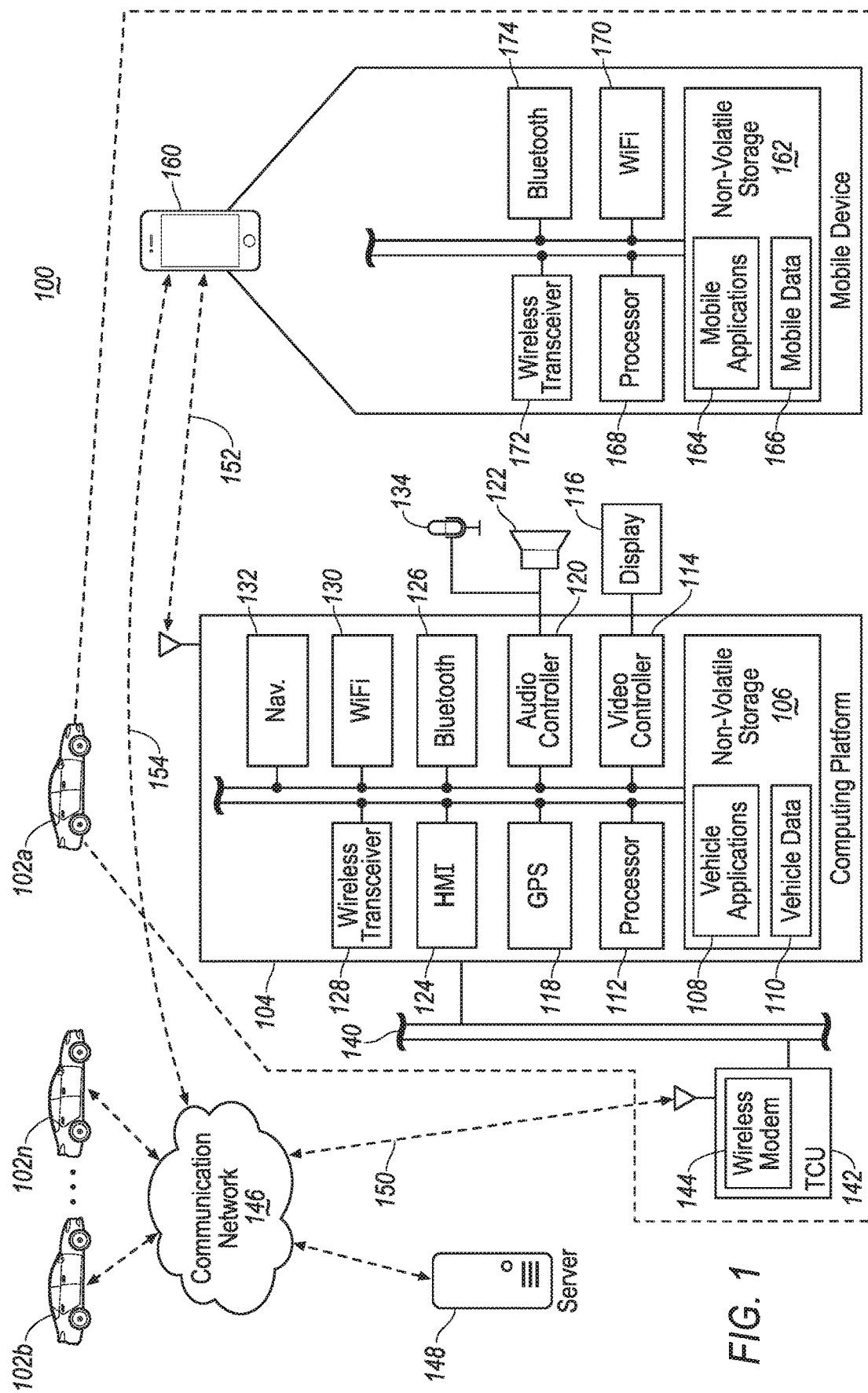
FIG. 1 illustrates an example block topology of a vehicle system of one embodiment of the present disclosure.

FIG. 1 illustrates an example diagram of a system 100 that may be used for cross-group messaging. The cross-group messaging system may include a plurality of vehicles 102, although the following description is made with reference to vehicle 102*a* as an example. Vehicle 102*a* may include various types of automobile, crossover utility vehicle (CUV), sport utility vehicle (SUV), truck, recreational vehicle (RV), boat, plane, or other mobile machine for transporting people or goods. In many cases, the vehicle 102*a* may be powered by an internal combustion engine. As another possibility, the vehicle 102*a* may be a hybrid electric vehicle (HEV) powered by both an internal combustion engine and one or move electric motors, such as a series hybrid electric vehicle (SHEV), a parallel hybrid electric vehicle (PHEV), a battery electric vehicle (BEV), or a parallel/series hybrid vehicle (PSHEV), a boat, a plane or other mobile machine for transporting people or goods. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, accident reporting, satellite radio decoding, receiving messages, sending messages, system update, and hands-free calling. Such instructions and other data may be maintained in a non-volatile manner using a variety of types of computer-readable storage medium 106. Vehicle data 110 may be stored in the computer-readable storage medium 106. As an example, vehicle data 110 may include information/data about a group preference previously selected by a user. For instance, the information about the group preference may include one or more of a brand of the vehicle 102; a model of the vehicle 102; a navigation route taken or to be taken by the vehicle 102; a geographic location of the vehicle 102; or a Point of Interest (POI) visited or to be visited by the vehicle 102. The group preferences options as a part of the vehicle data 110 are not limited to the above examples and depending on settings and configurations of the vehicle 102, more or less group preferences may be offered. As an example, the group preferences may be updated remotely (e.g. as the system updates). The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. As an example, the computing platform 104 may include the SYNC system manufactured by The Ford Motor Company of Dearborn, Mich.

The computing platform 104 may be provided with various features allowing the vehicle occupants/users to interface with the computing platform 104. For example, the computing platform 104 may receive input from human-machine interface (HMI) controls 124 configured to provide for occupant interaction with the vehicle 102a. As an example, the computing platform 104 may interface with one or more buttons (not shown) or other HMI controls configured to invoke functions on the computing platform 104 (e.g., steering wheel audio buttons, a push-to-talk button, instrument panel controls, etc.). The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speaker 122 configured to provide audio output to vehicle occupants, and one or more microphone 134 configured to receive audio input from the vehicle occupants, by way of an audio controller 120.

The computing platform 104 may be provided with location service features through a Global Positioning System (GPS) controller 118 configured to provide location data of the vehicle 102a. The location data provided by the GPS controller 118 may be used for navigation proposes. Additionally or alternatively, the location data may also be used to locate the vehicle 102a by a third party. The computing platform 104 may also be provided with navigation features through a navigation controller 132 configured to calculate navigation routes responsive to user input from the HMI controls 124 and the location data from the GPS controller 118. Maps used for navigation may be stored to and accessed from the storage 106 as a component of the vehicle data 110. Alternatively, the map data may be downloaded from a remote service through a wireless network in a real-time manner.

The computing platform 104 may be configured to communicate with a mobile device 160 of the vehicle occupants via a wireless connection 152. Alternatively, the mobile device 160 may connect to the computing platform 104 via a wired connection (not shown). The mobile device 160 may be any of various types of portable computing device, such as cellular phones, tablet computers, smart watches, laptop computers, portable music players, or other device capable of communication with the computing platform 104. In many examples, the computing platform 104 may include a wireless transceiver 128 in communication with a Bluetooth controller 126, a Wi-Fi controller 130, and other controllers such as a Zigbee transceiver, an IrDA transceiver, an RFID transceiver (not shown), configured to communicate with a compatible wireless transceiver 172 of the mobile device 160.

The mobile device 160 may include one or more processors 168 configured to perform instructions, commands, and other routines in support of the processes described herein. For instance, the mobile device 160 may be configured to execute instructions of mobile applications 164 to provide features such as textual messaging and voice calls. Such instructions and other data may be maintained in a non-volatile manner using a variety of types of computer-readable storage medium 162.

Mobile data 166 may be stored in the storage 162. As an example, mobile data 166 may include information about a group preference of the user, similar to the group preferences indicated by the vehicle data 110 stored in the storage 106 of the computing platform 104. The wireless transceiver 172, a Bluetooth controller 174, and/or a Wi-Fi controller 170 of the mobile device 160 may be configured to communicate with the wireless transceiver 128 of the computing platform 104.

The mobile device 160 may be configured to share the mobile data 166 including group preferences of the user with the computing platform 104. The computing platform 104 may be configured to determine the group preference of the user using both the vehicle data 110 and the mobile data 166. The storage 106 of the computing platform 104 may be configured to store group preferences for one or more users in the vehicle data 110, for example if the vehicle 102a is used by more than one user. Group preferences of a user may be input to the vehicle 102 through the HMI controls 124. The HMI control 124 may be configured to provide the user with options to select which group preference each time the vehicle 102a starts to operate. Additionally or alternatively, the computing platform 104 may be configured to identify the identity of the user by identifying an identity corresponding to a mobile device 160 connected to the computing platform 104 via the wireless connection 152, e.g., through previously-created pairing information which may also be stored at a part of the vehicle data 110.

As an example of group preferences identification, a first user of the vehicle 102a may have the group preferences of Group A and Group B previously selected and stored in the storage 106 as a part of the vehicle data 110; and a second user may have a preference of Group E stored in the vehicle data 110. The first user may newly select preference of Group C using his or her mobile device 160. This new preference may be stored to the storage 162 if, for example, the mobile data 166 has not yet been updated to the computing platform 104.

When the first user enters the vehicle 102a with his/her mobile device 160 previously paired with the computing platform 104, a wireless connection 152 is established. Responsive to the establishment of the wireless connection 152, the processor 112 may be configured to automatically identify the user using the pairing information stored in the storage 106. For instance, the processor 112 may be configured to automatically identify the first user according to identifying pairing information of the first user as corresponding to the connected mobile device 160, and load the preferences of the first user of Group A and Group B. In addition, the mobile device 160 may be configured to allow the computing platform 104 to access the mobile data 166 to load any newly-selected preferences, e.g., the addition of Group C, and update the group preferences stored in in the storage 106. As another example, responsive to the second user entering the vehicle 102a with his/her previously paired mobile device, the computing platform 104 may identify the second user using the pairing information and load the group preference of the second user (e.g., Group E).

The computing platform 104 may also be configured connect to a communication network 146 through a Telematics Control Unit (TCU) 142 via an in-vehicle network 140. The in-vehicle network 140 may include, but is not limited to, one or more of a controller area network (CAN), an Ethernet network, and a media oriented system transport (MOST), as some examples. The TCU 142 may be provided with a wireless modem 144 configured to communicate with a server 148 via a communication network 146 through a wireless connection 150. As an example, the communication network 146 is a cellular network. Alternatively, the computing platform 104 may also be configured to communicate with the communication network 146 via the mobile device 160 through a wireless connection 154.

One or more other vehicles, such as the vehicles 102b . . . 102n as shown, may be also connected to the communication network 146 to communicate with the server 148. Different vehicles 102 may have different group preferences and different users. The server 148 may be configured to coordinate and control the communication between members of each group. The server 148 may be further configured to allow messaging and communication between vehicles 102 having at least one common group preference, but prevent cross-group messaging for vehicles 102 without any group in common.

Figure 2:
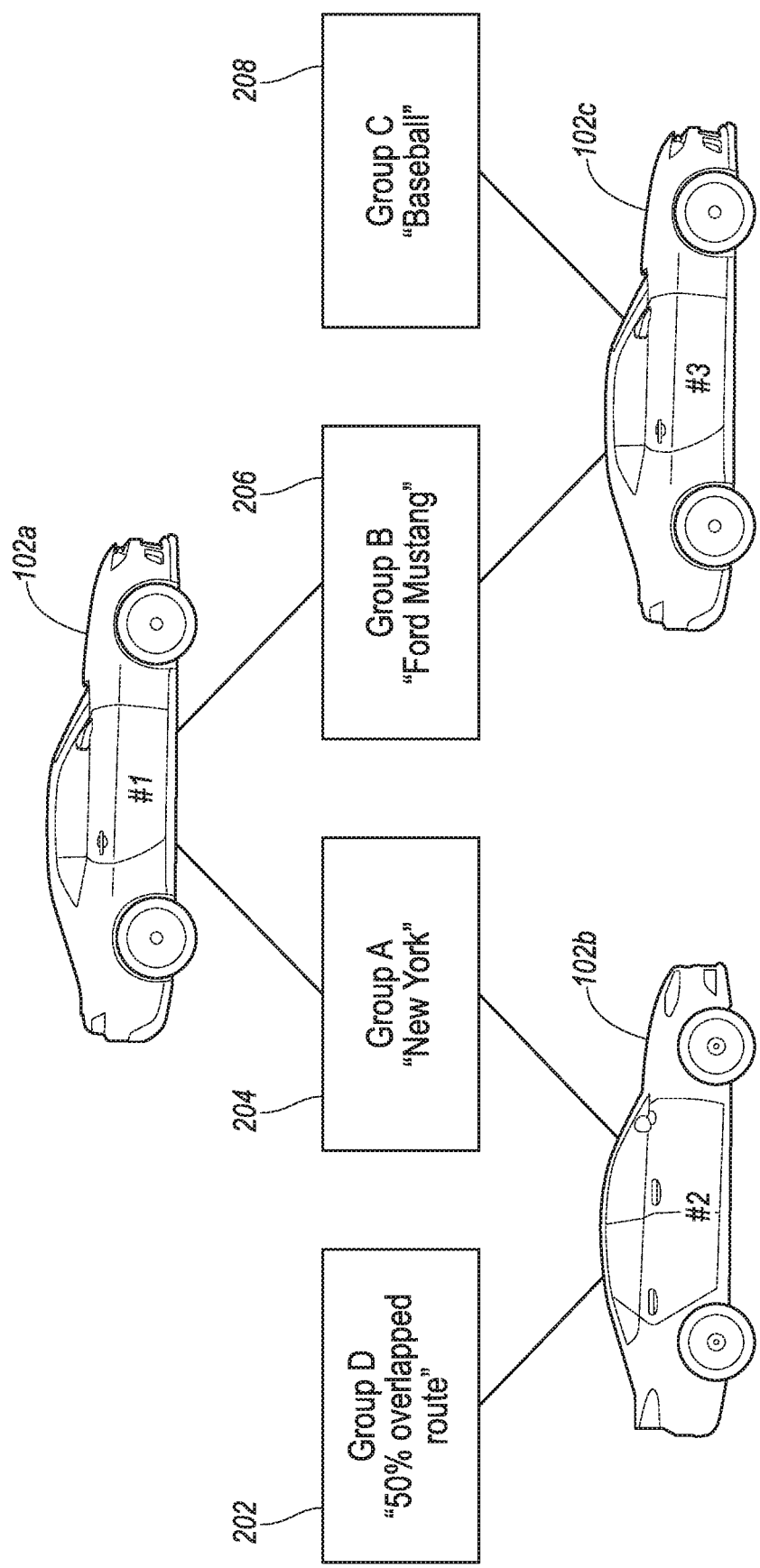
FIG. 2 illustrates an example block topology diagram of a messaging system of one embodiment of the present disclosure.

FIG. 2 illustrates an example block diagram 200 of a messaging system of one embodiment of the present disclosure. In the illustrated example, there are four groups that are managed and controlled by the server 148. A first vehicle 102a is a member of Group A 204 for users having a common destination of "Destination New York" and Group B 206 for vehicle 102 that are a "Ford Mustang." A second vehicle 102b is a member of Group A for "Destination New York" and also a member of Group D for vehicles having at least a "50% overlapped route" with other vehicles 102. A third vehicle 102c is a member of Group B for "Ford Mustang" and Group C for users having interest in "Baseball."

The server 148 may be configured to establish Group A for "Destination New York" responsive to the navigation setting of the navigation controller 132 from the first vehicle 102a or the second vehicle 102b. Alternatively, Group A may also be established responsive to a location data of the vehicles from the GPS controller 118. Alternatively, Group A may also be established manually by a user of a vehicle 102 in the messaging system 100. The server 148 may be configured to establish group B for "Ford Mustang" responsive to vehicle data 110 from the first vehicle 102a or the third vehicle 102c indicating vehicle model of Ford Mustang. Alternatively, the server 148 may be configured to allow a user to manually join the group by selecting the "Ford Mustang" preference even if the vehicle of the user is not associated with that specific vehicle model. The server 148 may be configured to establish Group C for "baseball" responsive to the user of the third vehicle 102c selecting baseball as his/her group preference. The server 148 may be configured to establish Group D for "50% overlapped route" responsive to a navigation route calculated by the navigation controller 132 of the second vehicle 102b. As an example, other vehicles (not shown) sharing at least 50% of the navigation route of the second vehicle 102b may be invited by the server 148 to join or automatically be joined to the Group D by the server 148.

In the example illustrated in FIG. 2, the first vehicle 102a may communicate with both the second vehicle 102b through Group A and the third vehicle 102c through Group B. However, the second vehicle 102b and the third vehicle 102c may be unable to communicate with one another because the second vehicle 102b and the third vehicle 102c have no group preferences in common.

For the first vehicle 102a to send a message, the computing platform 104 may be configured to receive a message from the user via the HMI controls 124 and send the message out via the TCU 142 to the server 148. For instance, the user input may be a text message or a voice message from the microphone 134. Responsive to receiving the message, the server 148 may be configured to determine the first vehicle 102a is a member of Group A and Group B, and send the message to member of both Groups A and B. In this case, the message may be sent to both the second vehicle 102b and the third vehicle 102c. Alternatively, the computing platform 104 may be configured to allow the user to select which specific groups or specific users he/she want to send a message to, instead of sending it to all groups in which he/she is a member of.

The first vehicle 102a may be configured to simultaneously receive messages from members of both Group A and Group B. When multiple messages are received at within a short period of time, the computing platform 104 may be configured to display or play the messages one after another with a pre-defined interval based on the receive time stamp. As an example, the pre-defined interval may be 5 seconds. For text a messages or photo, the computing platform 104 may be configured to display the message on the display 116 in the same window of the vehicle 102 HMI, regardless of from which group the message is received. Thus, the user of the first vehicle 102a receiving the message does not need to switch between windows or groups to display or play the various messages, increasing efficiency and ease of use. To differentiate messages from different groups, the background of the message may be color-coded. For instance, messages from Group A may be assigned with a first color background (e.g. red), and messages from Group B may be assigned with a second color background (e.g. blue). Similarly, color coding may be applied to not only message backgrounds, but also visual indicators or the messages. Additionally or alternatively, different audio chimes/alerts may be used for different groups. For instance, a chime may be output before or at the same time as displaying the message. Different audio chimes may be associated with different message groups to provide the user with audio input differentiating groups which the user has joined.

From the perspective of the first vehicle 102a, it appears that the second vehicle 102b, the third vehicle 102c and the vehicle 102a itself are in the same group, because the first vehicle 102a may send messages to and receive messages from both the second vehicle 102b and the third vehicle 102c. However, the second vehicle 102b and the third vehicle 102c may not communicate with one another because they do not share any common group. This grouping structure may be desirable to reduce redundant and unwanted messaging between vehicles 102. For instance, when the second vehicle 102b sends a message about an accident near New York, members of both Group A and Group D may receive the message. The first vehicle 102a may receive the message as a member of Group A, and the message may be helpful for the first vehicle 102a because it may be near or driving to New York as its destination. However, the third vehicle 102c does not receive the message, as the message is likely unhelpful for the third vehicle 102c which is not traveling to New York.

Figure 3:
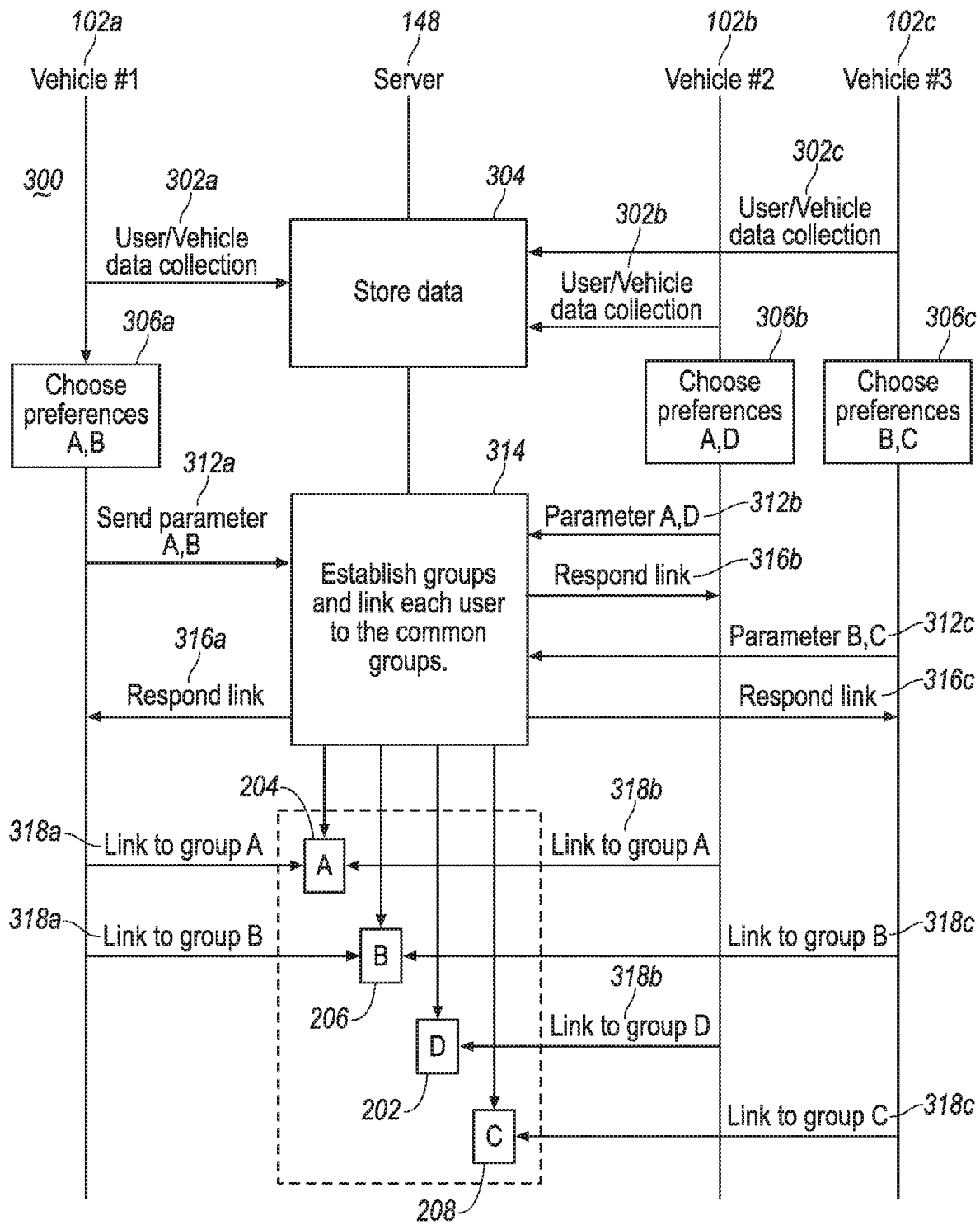
FIG. 3 illustrates an example data flow diagram for establishing a messaging system of one embodiment of the present disclosure.

With continuing reference to FIGS. 1 and 2, FIG. 3 illustrates an example data flow diagram 300 for establishing a messaging system of one embodiment of the present disclosure. For illustrative purposes, three vehicles 102 are used in this embodiment. As shown, these three vehicles 102 are the first vehicle 102a, the second vehicle 102b, and the third vehicle 102c respectively. At operation 302, each vehicle 102 sends its vehicle and/or user data 110 to the server 148 via the wireless connection 150 through the communication network 146. Alternatively, the vehicle 102 may be configured to send out the vehicle/user data via the wireless connection 154 using the mobile device connected to the computing platform 104. As an example, the vehicle/user data may include the information about the make and model of the vehicle, vehicle location, navigation route, among other possibilities. At operation 304, the server 148 may be configured to store data sent from the vehicles 102.

At operation 306, each vehicle 102 may be configured to allow the users to select group preferences. For instance, the user of the first vehicle 102a selects group preferences of A and B; the user of the second vehicle 102b selects group preferences of A and D; and the user for the third vehicle 102c selects group preferences of B and C. As operation 312, each vehicle 102 sends the group preferences selected by the users to the server 148 via the communication network 146. At operation 314, the server 148 may be configured to establish groups and link each user to the common groups. In this example, there are four groups total to be established responsive to the group preferences received from the vehicles 102. Additionally or alternatively, some groups may be established automatically responsive to the user/vehicle data collection at operation 302. As an example, the server 148 may be configured to automatically establish a group for "Ford Mustang," responsive to the vehicle data indicating a Ford Mustang vehicle.

At operation 316, the server 148 may send a response link back to each vehicle 102 to acknowledge receipt of the group parameters. The response link indicates to the vehicle 102 that the parameters were received as well as what groups the vehicle 102 is a member of. Responsive to receiving the response link, at operation 318, the vehicles 102 may link to each of their selected groups at the server 148. With continuous reference the example discussed above, the first vehicle 102a may link to Group A and Group B; the second vehicle 102b may link to Group A and Group D; and the third vehicle 102c may link to Group B and Group C.

Figure 4:
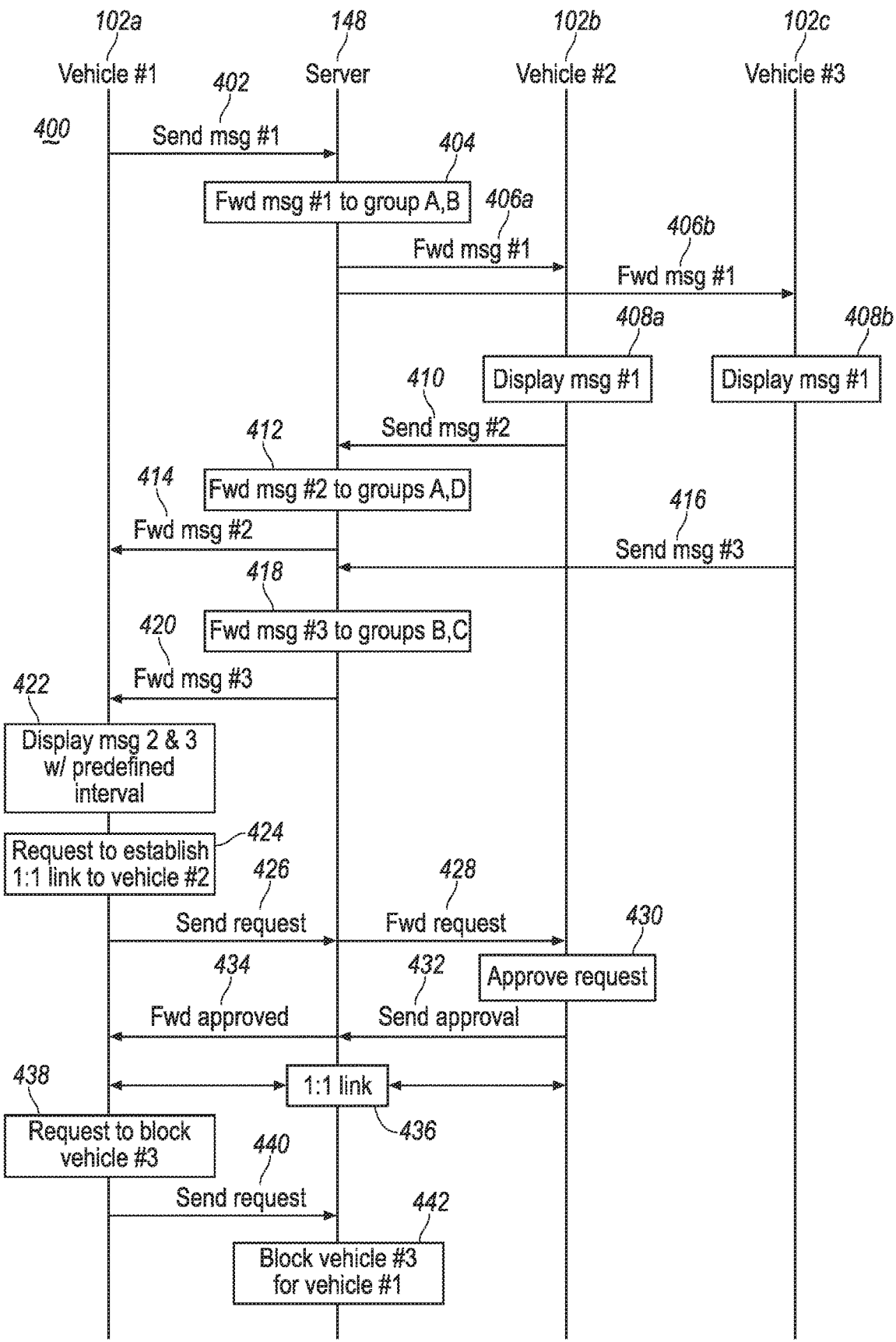
FIG. 4 illustrates an example data flow diagram of the messaging system of one embodiment of the present disclosure.

FIG. 4 illustrates an example data flow diagram 400 of the messaging system with continuous reference to FIG. 3. Similarly using three vehicles 102 and one server 148 as illustrated in FIG. 3, at operation 402 the first vehicle 102a sends a first message to the server 148. Responsive to receiving the first message, at operation 404, the server 148 using the group preferences of the first vehicle 102a, to forward the first message to Group A and Group B which the first vehicle 102a is linked to. At operation 406, the server 148 may forward the first message to the second vehicle 102b as a member of Group A and the third vehicle 102c as a member of Group B. At operation 408, the second vehicle 102b and the third vehicle 102c may each display the first message responsive to respective receipt of the message.

At operation 410, the second vehicle 102b may send a second message to the server 148. At operation 412, responsive to receiving the second message, the server 148 may decide to forward the message to members of Group A and Group D, to which the second vehicle 102b is linked. At operation 414, the server 148 may forward the second message to the first vehicle 102b as a member of Group A. At operation 416, the third vehicle 102c may send a third message to the server 148. At operation 418, responsive to receiving the third message, the server 148 may decide to forward the message to members of Group B and Group C, to which the third vehicle 102c is linked. At operation 420, the server 148 may forward the third message to the first vehicle 102a as a member of Group B. Responsive to receiving the second and third messages, at operation 422, the first vehicle 102a may be configured to display the second and third messages within a pre-defined interval, based their receiving time stamp. As an example, the second message was received before the third message. The first vehicle 102a may be configured to display the second message first using the display 116, and after a pre-defined interval (e.g. 5 seconds), display the third message using the display 116 in the same window. From the perspective of the user of the first vehicle 102a, it appears that he/she is in the same group as the second vehicle 102b and the third vehicle 102c, and there is little difference between the source of origin between the second message and the third message.

As an example, the cross-group messaging system may be configured to allow establishing 1:1 communication link between vehicles. At operation 424, the first vehicle 102a may wish and request to establish a 1:1 link to a second vehicle. At operation 426, the request is sent to the server 148, which forward the request to the second vehicle 102b for approval. At operation 430, the user of the second vehicle 102b may approve the 1:1 link request and the approval may be sent back to the server 148 at operation 432. The server 148 may be configured to forward the approval to the first vehicle 102a at operation 434. At operation 436, a 1:1 link is established between the first vehicle 102a and the second vehicle 102b at the server 148. The first vehicle 102a and the second vehicle 102b may communicate directly via the 1:1 link.

As an example, the cross-group messaging system may be configured to allow a vehicle to block messages sent from another vehicle. At operation 438, the user of the first vehicle 102a may request to block further communications from the third vehicle 102c. At operation 440, the first vehicle 102a may send the request to the server 148. Responsive to receiving the request, the server 148 may be configured to put the third vehicle 102c into a block list for the first vehicle 102a, and any further messages sent from the third vehicle 102c will be blocked from sending to the first vehicle 102a by the server 148. For instance, the blocking may be permanent. Alternatively, the blocking may be temporary lasting for a specific period of time, or until a specific event such as the end of a trip. As an alternative example, the blocking of messages from the third vehicle 102c may be performed by the computing platform 104 of first vehicle 102a without using the server 148. The server 148 may still forward messages from third vehicle 102c and the vehicle 102a may be configured to block the message and not displaying them responsive to receiving the messages.

In order to reduce redundant or unwanted messages, the system may be configured to limit the maximum number of preferences that a user is allowed to select. In addition, the system may be configured to limit the maximum number of connections for each vehicle within the selected group preferences, and allow the user of the vehicle to refresh and update the connections. In addition, the system may be configured to allow the user of a vehicle to add/remove an individual connection. The removal can be temporary, such as for one ignition cycle, or be permanent as a block list.

As an example, the server 148 may find a great number of connections, such as one hundred connections, that qualify the group preferences of a vehicle 102, while the vehicle 102 has limited the maximum connections to a lower number, such as twenty connections. The system may be configured to allow the user to refresh the group to disconnect from the current twenty connections and connect to another twenty new connections within the one hundred qualified connections. For instance, the system may be configured to allow the user to keep individual current connections and refresh the rest. As an example, the system may also be configured to allow the user to refresh a single user to disconnect from a current single connection and add a new connection.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for a vehicle, comprising:
a controller, configured to
send a first route planned for the vehicle to a server;
send group preference data to the server to cause the server to link the vehicle to groups including other vehicles consistent with the group preference data, wherein the group preference data is indicative of a part of the first route such that the groups include a group of vehicles having one or more second routes overlapping with the first route for at least a predefined amount; and
responsive to receiving a response link from the server acknowledging receipt of the group preference data, communicate multiple messages between the vehicle and the other vehicles determined by the server to be in the group of vehicles having one or more second routes.

2. The system of claim 1, wherein the group preference data includes one or more of a brand of the vehicle, a model of the vehicle, or a destination of the vehicle.

3. The system of claim 2, wherein the groups include at least one of: a group for vehicles of the same brand as the vehicle, a group for vehicles of the same model as the vehicle, and a group for vehicles headed to the same destination as the vehicle.

4. The system of claim 1, wherein the multiple messages include a plurality of messages received to the controller, and the controller is further configured to display the plurality of messages in a single messaging window.

5. The system of claim 4, wherein the controller is further programmed to display the plurality of messages separated by a pre-defined interval of time.

6. The system of claim 4, wherein the controller is further configured to automatically display incoming messages of the multiple messages.

7. The system of claim 1, wherein the controller is further configured to receive at least a subset of the group preference data from a mobile device connected to the vehicle.

8. The system of claim 1, wherein the controller is further configured to use a group preference responsive to identification of a user by a mobile device connected to the vehicle.

9. The system of claim 1, wherein the controller is further configured to establish a 1:1 connection to another vehicle.

10. The system of claim 1, wherein the controller is further configured to block a message from a particular vehicle responsive to receiving an instruction from a user to add an indication of the particular vehicle to a block list.

11. The system of claim 1, wherein the messages include at least one of the following types: emergency/accident information; traffic information; a fuel/charging station location; point of interest (POI) information; a vehicle experience; a driving experience; infrastructure information; or a help message.

12. A server, comprising:
a processor programmed to:
receive a first route planed for a vehicle of a plurality of vehicles,
responsive to group preferences received from the plurality of vehicles, send response links to the plurality of vehicles acknowledging receipt of the group preferences, establish a plurality of groups and link the plurality of vehicles to the groups, and
responsive to receiving a message sent from the vehicle, forward the message to members of a group to which the vehicle is linked, wherein the group preferences are indicative of a plurality of routes associated with the plurality of vehicles having at least a predefined amount of overlap between the first route and the plurality of routes.

13. The server of claim 12, wherein the group preferences include one or more of a brand of the vehicle, a model of the vehicle, or a destination of the vehicle, and the plurality of groups include at least one of: a group for vehicles of the same brand as the vehicle, a group for vehicles of the same model as the vehicle, and a group for vehicles headed to the same destination as the vehicle.

14. The server of claim 12, wherein the processor is further programmed to store a group preference data received from a vehicle in a storage.

15. The server of claim 12, wherein the processor is further programmed to block a message from being forwarded to the vehicle responsive to a blocking request from the vehicle.

16. The server of claim 12, wherein the processor is further programmed to receive user data from the vehicle, and responsive to user data, automatically establish a user group and link the vehicle in accordance with the established user group.

17. The server of claim 12, wherein the processor is further programmed to establish a 1:1 connection between a first vehicle and a second vehicle responsive to a 1:1 connection request from the first vehicle and an approval from the second vehicle.

18. The server of claim 12, wherein the processor is further programmed to limiting maximum number of member for each group using geographic location data from the members.

19. A method for a vehicle, comprising:
sending a first route planned for the vehicle to a server;
sending group preference data to the server to cause the server to link the vehicle to groups including other vehicles consistent with the group preference data, wherein the group preference data is indicative of a part of the first route such that the groups include a group of vehicles having one or more second routes overlapping with the first route for at least a predefined amount; and
responsive to receiving a response link from the server acknowledging receipt of the group preference data, communicating multiple messages between the vehicle and the other vehicles determined by the server to be in the group of vehicles having one or more second routes.

20. The method of claim 19, further comprising receiving at least a subset of the group preference data from a mobile phone in communication with the vehicle.

* * * * *